Jan. 11, 1938. J. MIHALYI 2,105,256

CAMERA

Filed Aug. 11, 1936

INVENTOR.
Joseph Mihalyi
BY
Newton N. Perrins
Rolla N. Carter
ATTORNEYS

Patented Jan. 11, 1938

2,105,256

UNITED STATES PATENT OFFICE 2,105,256

CAMERA

Joseph Mihalyi, Rochester, N. Y., assignor, by mesne assignments, to Eastman Kodak Company, Jersey City, N. J., a corporation of New Jersey Application August 11, 1936, Serial No. 95,374

2 Claims. (Cl. 95—44)

My present invention relates to photographic cameras and particularly to cameras provided with objective lenses adjustable for focusing and coupled range finders for indicating correct focus.

Cameras provided with range finders coupled to focusing objectives require great accuracy in their construction and must be carefully designed in order to insure at all times the required strict relation between the objective lens and the range finder. It is also important to be able at all times to view the field which the camera is capable of recording.

It is an object of my invention to provide a camera with an improved and simplified coupling arrangement between its adjustable objective lens and its range and view finders.

Another object of my invention is to provide a coupling arrangement between the focusing adjustment of the objective lens and the range and view finders such that any given focusing adjustment always imparts a predetermined adjustment in the range and view finders.

Other objects of the invention reside in the structure and arrangement of the several parts forming the camera of my invention, and will be understood from the following description when read in connection with the accompanying drawing, in which.

Figure 1:
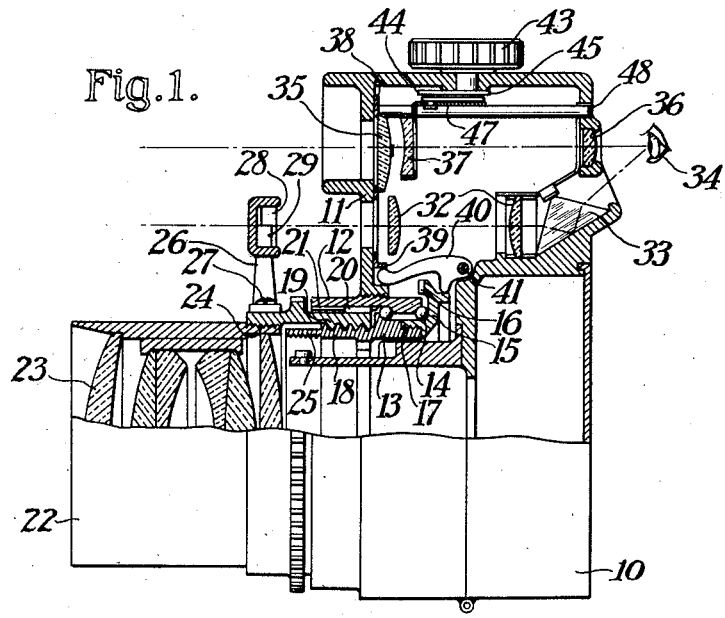
Fig. 1 is a view partly in section of a camera embodying the invention.

In the embodiment of the invention shown in Fig. 1, a camera 10 has secured in its front wall 11 a tubular member 12 in which is mounted a focusing sleeve 13 which is rotatable in a suitable bearing provided in the member 12, such as ball bearing 14. The inner end of the focusing sleeve 13 comprises a flange member 15 provided on its forward face with suitable gear teeth 16, through which the sleeve 13 is rotated, in a manner which will be described in connection with Fig. 4. The flange member 15 may be integral with the sleeve 13 or secured thereto in any suitable manner as by screw threads 17, as shown in Fig. 1. The sleeve 13 is provided with external screw threads 18 which engage similar threads provided internally of a ring member 19, which is provided with a key 20 extending into a longitudinal key-way 21 provided in the tubular member 12, which is firmly secured to the camera wall 11. This key 20 permits axial movement of the ring member 19, but holds it against rotation when the focusing sleeve 13 is rotated, whereby rotation of the sleeve 13 transmits corresponding axial movement to the ring member 19 in accordance with the pitch of the threaded coupling 18. The outer end of the ring 19 is adapted to receive an objective mount 22, in which is mounted any suitable objective lens 23. The objective mount 22 is preferably detachably secured to the ring 19 in some suitable manner, such as by screw threads 24, so that it may readily be removed to permit the attachment of lenses of other focal length which, for the reasons pointed out below, are adapted to be secured to the focusing sleeve 13 by means of screw threads 25 provided therein. It is thus seen that with the standard or normal objective mount 22 secured to the ring 19, as shown in Fig. 1, rotary movement of the focusing sleeve 13 will impart a corresponding axial movement to the objective mount 22, since it is movable with the ring 19.

Any one of the parts which is movable upon the focusing of the objective 23 may be employed for actuating the movable part or parts of a range finder with which the camera is provided, but I prefer to employ for this purpose the axial movement of the ring member 19. When the camera 10 is provided with a range finder of the type shown in Fig. 3, the ring 19 is provided with an upright standard 26 secured thereto in any suitable manner, as by a screw 27. The standard 26 forms a rigid support for two mirrors 28 and 29 which form the movable part of the range finder system, which will now be described in connection with Fig. 3, which shows the essential optical elements of this range finder system as comprising two spaced concave mirrors 30 and 31, which preferably consist of two independent sections of a concave reflector having a focal length equal to the focal length of the standard or normal camera lens 23 which is mounted directly in the ring 19. These two reflectors 30 and 31 form the base of the range finder system and are mounted in the front wall 11 of the camera, so that their mutual focal plane will coinside with the two small reflectors or mirrors 28 and 29, which are so positioned as to receive the two beams coming from the mirrors 30 and 31, respectively, and to direct these beams rearwardly along a common axis, on which is mounted an ocular comprising lenses 32 which has a focal length substantially equal to its separation from the mirrors 28 and 29. A suitable prism 33 is preferably positioned behind the ocular 32 for directing the light emerging therefrom at the proper angle for striking the eye 34 of an observer, when his eye is positioned for observing the field through the view finder which will be described below. The range finder just described is a well known type in which the mirrors 28 and 29 provide the two adjacent fields of the split image employed for range finding purposes, as is well known.

When the sleeve 13 is rotated to focus the objective lens 23, the mirrors 28 and 29 are moved by the axial movement of the objective 23, and since the function of convergence in the range finder system is in direct proportion to the convergence function of the standard or normal objective lens 23, it follows that when the camera is focused on a target at infinity, the parallel beams falling on the range finder mirrors 30 and 31 will form at the mirrors 28 and 29 a complete image. In order to focus on a target at a short distance, the separation between the mirrors 30 and 31 and the mirrors 28 and 29 must be increased to bring about coincidence of the two images formed thereby, and when these images are no longer mutilated, the camera objective lens will be properly focused on such nearer target.

Figure 2:
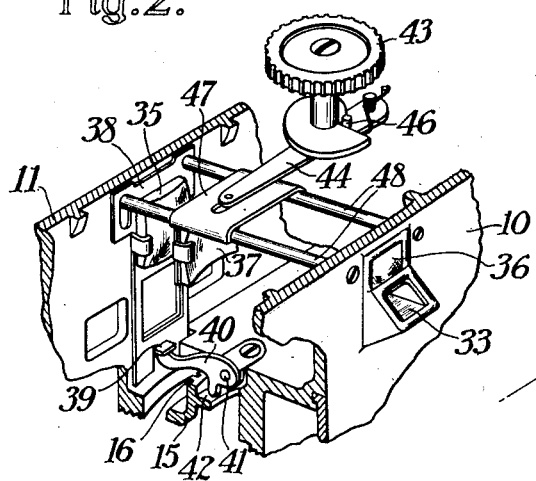
Fig. 2 is a fragmentary view in perspective showing the mounting structure of the view finder.
Figure 3:
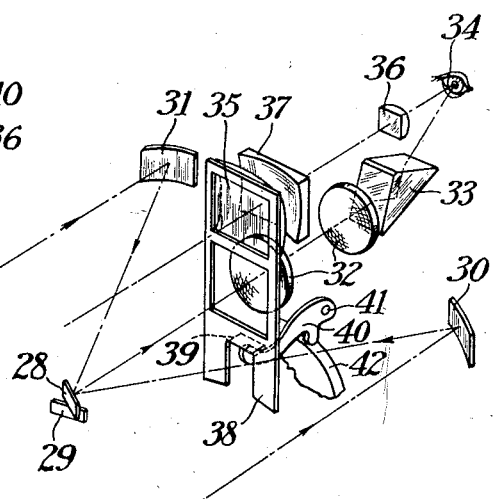
Fig. 3 is a view in perspective showing the optical parts of the range and view finders; and, Fig. 4 is a detail plan view partly in section showing the mechanism for actuating the focusing sleeve of the camera shown in Fig. 1.

The camera 10 is also provided with a suitable view finder, as shown in Figs. 1, 2 and 3, which may be of the variable power type as described in my Patent No. 2,043,900. This view finder comprises a front positive lens 35, a rear eyelet lens 36 and a negative field lens 37 positioned behind the front positive lens 35 and adjustable along the axis of the view finder for varying its power to correspond to the focal length of the objective being used in the camera. The view finder is preferably mounted in the camera 10 with its axis immediately above the observation opening of the range finder, so that a slight angular movement of the eye of the observer is all that is necessary to shift from the range finder to the view finder system.

As best shown in Fig. 2 the front positive lens 35 of the view finder is carried in a frame 38 which is mounted for vertical movement for compensating or accommodating parallax, which would normally be present due to the spacing of the axes of the camera lens and the view finder. The lower end of the frame 38 is provided with a suitable shoulder 39 against the underside of which bears the free end of a lever 40, pivoted at 41 and adapted to be rotated about the pivot 41 by means of a cam ring 42 provided on the rear face of the focusing sleeve flange 15. The cam 42 is so shaped that when the focusing sleeve 13 is rotated, the view finder lens 38 is shifted sufficiently to cause the axis of the view finder to cross the axis of the objective lens 23 at the distance for which the camera is focused.

When interchangeable lenses are employed, the negative field lens 37 of the finder is shifted along the finder axis by rotating a suitable knob 43 which operates a swinging arm 44 through a cam 45 and a pin 46. The arm 44 engages in some suitable manner a plate member 47 which carries the negative field lens 37, and which is mounted for sliding movement on rods 48 extending between the front and rear walls of the camera.

It will be understood that adjustment of the knob 43 shifts the negative field lens 37 to reduce the angular field of the view finder to correspond with the smaller field covered by a lens of longer focal length.

Figure 4:
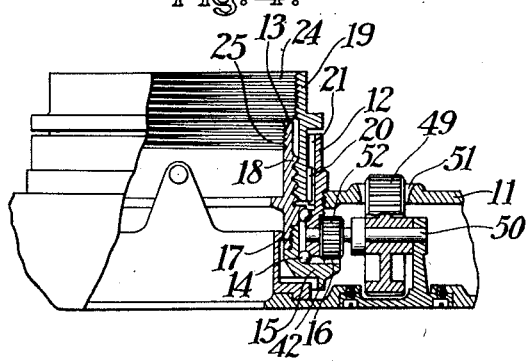

In Fig 4. the arrangement for imparting the rotatable movement to the focusing sleeve 13 is shown as comprising a small knurled wheel 49 mounted on a shaft 50 which is suitably journaled in parts rigidly connected to the camera body. A small portion of the periphery of the wheel 49 extends through an opening 51 provided in the front wall 11 of the camera, and preferably to one side of the camera lens, so as to be convenient for the hand of the user.

The shaft 50, to which the hand wheel 49 is secured, is provided with a small gear 52 which meshes with the gear teeth 16 provided on the front face of the flange member 15 secured to the focusing sleeve 13. It is thus evident that rotation of the hand wheel 49 imparts angular movement to the focusing sleeve 13 which functions to focus the objective 23, to shift the finder lens 35 for parallax accommodation and to move correspondingly the range finder mirrors 28 and 29 as fully described above. It will, of course, be understood that some suitable means is provided to limit the angular movement of the sleeve 13 to its predetermined range, as is well known.

When it is desired to employ lenses other than the standard lens 23, such lenses will be secured directly to the rotatable focusing sleeve 13 in the manner and for the purpose described in my copending application Serial No. 95,375 filed concurrently herewith. Also, it will be understood that the particular type of range finder illustrated and described may be replaced with some other type of range finder, such as the relatively long base type shown in Fig. 4 of my above-mentioned copending application.

From the above description it will be apparent that my invention makes possible a compactly arranged and accurately functioning camera construction in which the small number of parts employed for performing with precision the several adjustments involved reduces to a minimum the number of parts requiring highly skilled hand labor in manufacture.

Although, for the purpose of making my invention clear, I have described it in connection with a specific embodiment thereof, I desire it to be understood that I do not wish to be limited thereby, but desire to cover the many modifications which will be obvious to those skilled in the art, which modifications fall within the spirit of my invention, the scope of which is pointed out in the appended claims.

What I claim as my invention and desire to secure by Letters Patent of the United States is:

1. In a camera, a sleeve, mounting means supporting the sleeve for rotation on its axis but holding it against axial movement, an outer tubular member surrounding the sleeve and having a screw connection therewith, an axial extending key-way in said mounting means, a key on the outer tubular member slidably engaging said key-way to hold said tubular member against rotation, a lens detachably fastened to said tubular member, means for rotating said sleeve relative to the mounting means, whereby axial movement is imparted through the screw connection to said tubular member and the lens, a range finder including a movable optical member connected to said tubular member, a view finder adjustable to alter its field of view, and means for adjusting the view finder in accordance with the rotational movement of said sleeve to compensate for parallax between said finder and the lens.

2. In a photographic camera, a housing having a front wall, an annular shell secured in the front wall, a rotatable focusing sleeve journaled in the shell and extending beyond the rear end of the shell in the housing, the forward portion of said sleeve having an external diameter smaller than the internal diameter of the forward portion of said shell, thereby providing an annular recess, a tubular member internally threaded to said sleeve and externally keyed to said shell for movement relative to said shell only in an axial direction, a range finder including a movable optical member connected to the tubular member, a view finder including an optical part movable for accommodating parallax, a coupling between said optical part and the portion of said sleeve extending rearwardly of said shell for moving said optical part in accordance with the rotational movement of said sleeve, and means on the forward end of said tubular member for releasably holding a lens mount.

JOSEPH MIHALYI.